(12) United States Patent
Cristofoli et al.

(10) Patent No.: US 9,904,311 B1
(45) Date of Patent: Feb. 27, 2018

(54) SYSTEM AND A METHOD FOR A WAVEFORM GENERATOR

(71) Applicant: STMicroelectronics S.r.l, Agrate, Brianza (IT)

(72) Inventors: Bruno Cristofoli, Piverone (IT); Marco Scipioni, Asparetto di Cerea (IT)

(73) Assignee: STMICROELECTRONICS S.R.L., Agrate Brianza, MB (IT)

( * ) Notice: Subject to any disclaimer, the term of this patent is extended or adjusted under 35 U.S.C. 154(b) by 0 days.

(21) Appl. No.: 15/232,572

(22) Filed: Aug. 9, 2016

(51) Int. Cl.
*G06F 1/02* (2006.01)

(52) U.S. Cl.
CPC .......... *G06F 1/022* (2013.01); *G06F 2101/02* (2013.01); *G06F 2101/04* (2013.01)

(58) Field of Classification Search
CPC .......... G06F 1/02; G06F 1/022; G06F 1/0342; G06F 1/0328; G06F 2101/04; G06F 1/0321; H04L 27/22; H04L 27/06
See application file for complete search history.

(56) References Cited

U.S. PATENT DOCUMENTS

| | | | | |
|---|---|---|---|---|
| 3,697,697 A * | 10/1972 | Audretsch, Jr. | ......... | H04L 23/02 370/208 |
| 4,482,974 A * | 11/1984 | Kovalick | .............. | G06F 1/0356 327/106 |
| 4,486,846 A | 12/1984 | McCallister et al. | | |
| 5,276,633 A * | 1/1994 | Fox | ........................ | G06F 1/0353 708/276 |
| 5,619,154 A * | 4/1997 | Strolle | .................... | G06F 1/022 327/100 |
| 5,737,253 A * | 4/1998 | Madisetti | .............. | G06F 1/0328 708/276 |
| 6,657,573 B2 * | 12/2003 | Langlois | ................. | G06F 7/548 341/147 |
| 7,580,964 B2 * | 8/2009 | Merlo | ..................... | G06F 1/022 327/105 |
| 7,933,942 B2 * | 4/2011 | McDonald | .............. | G06F 1/022 708/276 |
| 2002/0116181 A1 * | 8/2002 | Khan | ..................... | G06F 7/5446 704/205 |
| 2005/0278403 A1 | 12/2005 | Miller | | |
| 2006/0167962 A1 * | 7/2006 | Torosyan | .............. | G06F 1/0353 708/271 |
| 2008/0123777 A1 * | 5/2008 | Trager | .................. | G06F 1/0335 375/316 |

OTHER PUBLICATIONS

Wang et al. "Phase-Adjustable Pipelining ROM-Less Direct Digital Frequency Synthesizer with a 41.66-MHz Output Frequency", Oct. 2006, IEEE transactions on Circuits and Systems, pp. 1143-1147.*

(Continued)

*Primary Examiner* — Sophia Vlahos
(74) *Attorney, Agent, or Firm* — Slater Matsil, LLP

(57) ABSTRACT

According to an embodiment, a waveform generator includes a phase accumulator configured to generate a digital phase signal representing a phase angle, and a phase-to-amplitude converter configured to receive the digital phase signal as a phase input, and generate sine and cosine waveform values as digital amplitude signals, wherein the phase-to-amplitude converter does not include a look-up table.

16 Claims, 12 Drawing Sheets

(56) References Cited

OTHER PUBLICATIONS

Hatai et al. "A High-Speed, ROM-Less DDFS for Software Defined Radio System", Dec. 2010, IEEE, pp. 115-119.*
Cao et al. "A ROM-less Direct Digital Frequency Synthesizer Based on a Scaling-free CORDIC algorithm", Aug. 2011, IEEE, pp. 1186-1189.*
Maharatna et al. "Virtually Scaling-free adaptive CORDIC rotator", Nov. 18, 2004, IEE Proceedings—Computers and Digital Techniques, pp. 448-456.*
Ertl, et al., "Increasing the Frequency Resolution of NCO-Systems Using a Circuit Based on a Digital Adder," IEEE Transactions on Circuits and Systems-II: Analog and Digital Signal Processing, vol. 43, No. 3, Mar. 1996, 4 pages.
Saber, et al., "Low Noise-Low Power Digital Phase-Locked Loop," Japan Society for the Promotion of Science, Date of Conference Nov. 21-24, 2010, 6 pages.
Yang, et al., "A Direct Digital Frequency Synthesizer Using a New ROM Compression Method," Solid-State Circuits Conference, 2001, Date of Conference Sep. 18-20, 2001, 4 pages.

* cited by examiner

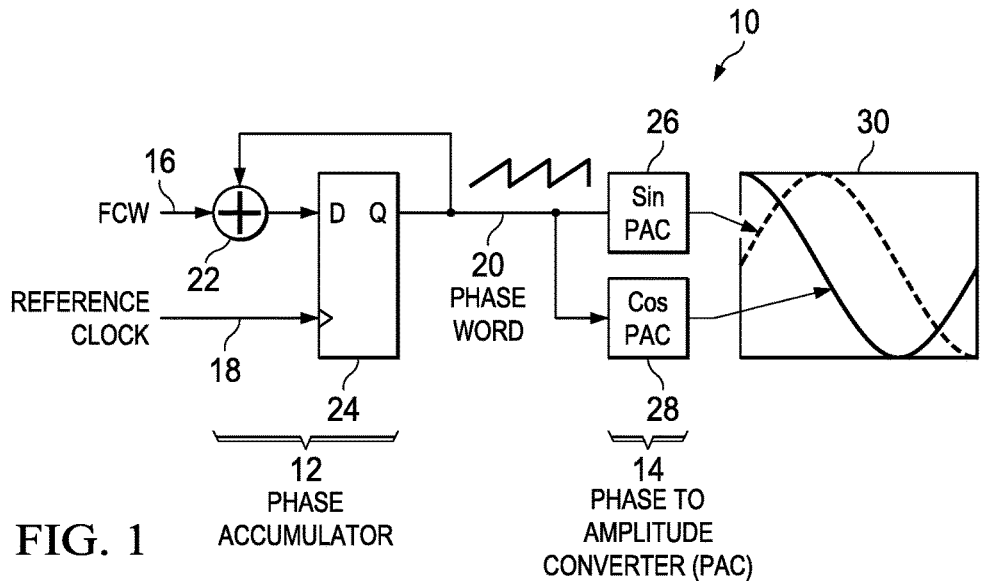
FIG. 1
$$\sin(\alpha+\beta) = \sin(\alpha) * \cos(\beta) + \cos(\alpha) * \sin(\beta)$$
$$\cos(\alpha+\beta) = \cos(\alpha) * \cos(\beta) - \sin(\alpha) * \sin(\beta)$$
FIG. 2A
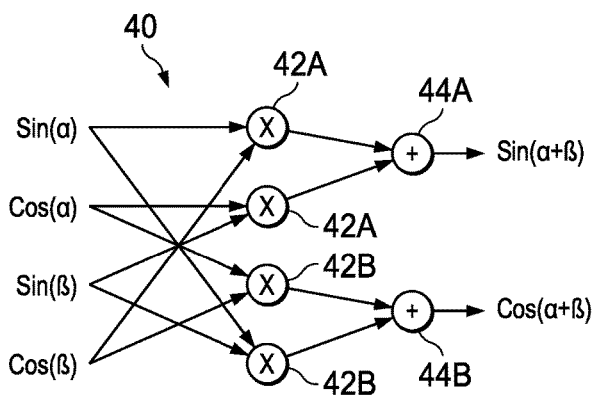
FIG. 2B
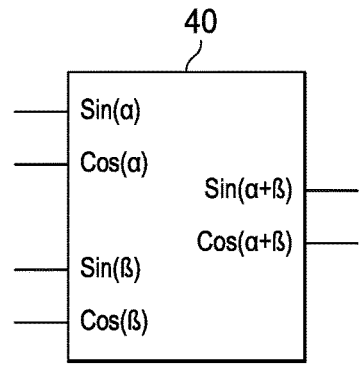
FIG. 2C

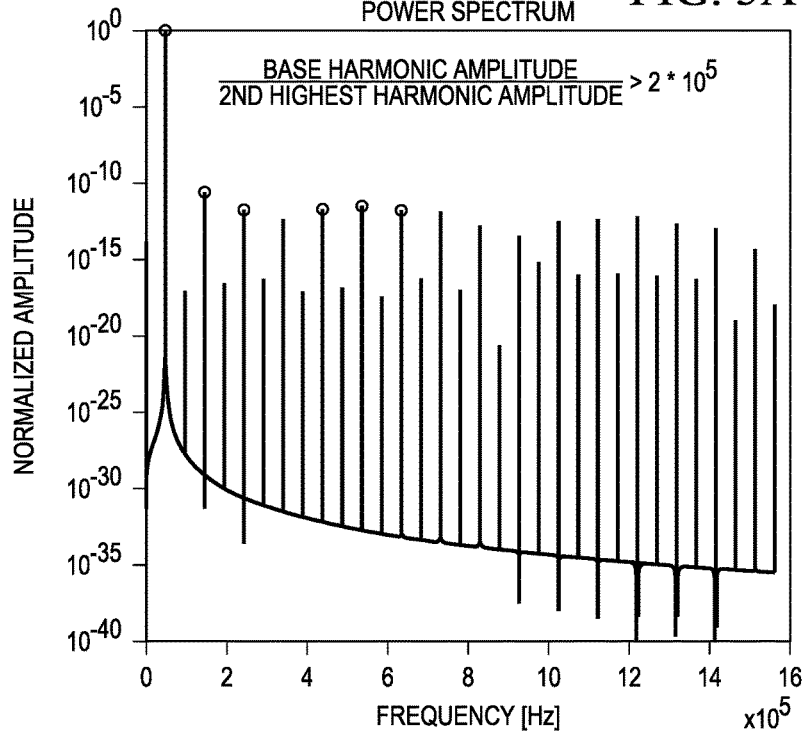
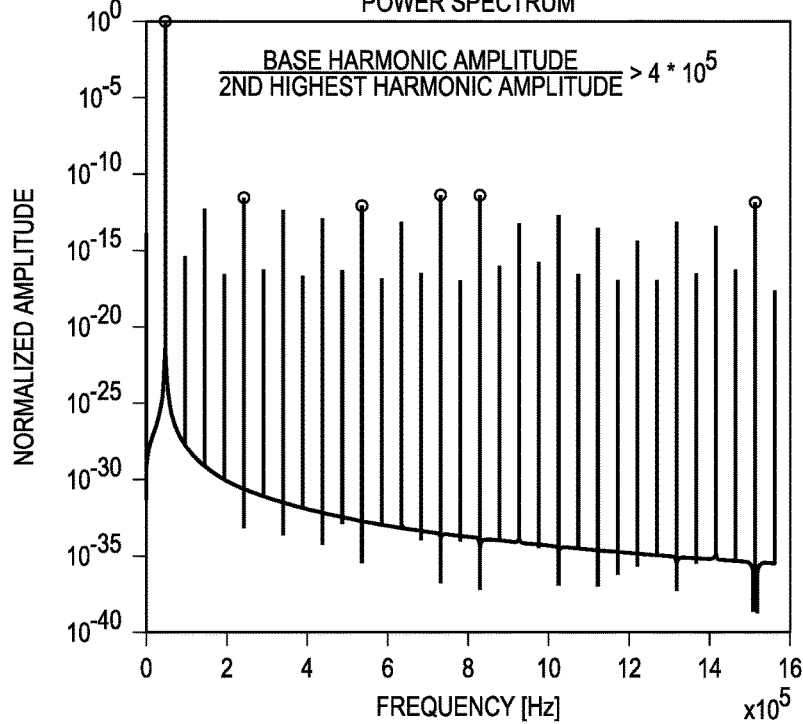

US 9,904,311 B1

SYSTEM AND A METHOD FOR A WAVEFORM GENERATOR

TECHNICAL FIELD

The present invention relates generally to a sinusoidal waveform generator, and, in particular embodiments, to a system and method for a numerically controlled oscillator.

BACKGROUND

It is common in numerous industries to use various methods to approximate sine (sin) and/or cosine (cos) wave signals from an existing or generated input signal. Such signal approximation is used for data and voice communications, including audio and visual communications in the telecommunications and entertainment industries. Other uses may include providing signals for testing equipment for development and manufacturing of electronic components, or for troubleshooting defective electronic components.

Various implementations of sin-cos wave signal approximation have been previously implemented to varying degrees of precision and efficiency. A common method is to provide a very large lookup table of pre-calculated (sin-cos) values, where the accuracy of the approximation is dependent upon the size of the table (i.e. the number of pre-calculated values.) Traditionally the size of the lookup table is approximately $2^{level\ of\ accuracy}$, resulting in exponentially larger tables to increase the accuracy.

SUMMARY

According to an embodiment, a waveform generator includes a phase accumulator configured to generate a digital phase signal representing a phase angle, and a phase-to-amplitude converter configured to receive the digital phase signal as a phase input, and generate sine and cosine waveform values as digital amplitude signals, wherein the phase-to-amplitude converter does not include a look-up table.

According to another embodiment, a method includes receiving a digital phase signal representing a phase angle, determining a first sine value and a first cosine value of at least a first bit of the digital phase signal at an input stage, determining a second sine value and a second cosine value of at least a second bit of the digital phase signal at the input stage, calculating a third sine value and a third cosine value based on the first and second sine values and the first and second cosine values at an output stage, and generating digital amplitude signals with the third sine value and the third cosine value.

According to a further embodiment, a phase-to-amplitude converter includes a first stage circuit configured to receive a digital phase signal representing a phase angle, the digital phase signal having at least sixteen bits, the first stage circuit being further configured to determine sine and cosine values of subsets of the digital phase signal, and output the determined sine and cosine values of the digital phase signal, and a second stage circuit directly connected to the output of the first stage circuit, the second stage circuit configured to calculate sine and cosine values of the determined sine and cosine values of the digital phase signal.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a block diagram of an numerically controlled oscillator in accordance with some embodiments;

FIGS. 2A, 2B, and 2C illustrate angle addition formulas and block diagrams of the angle addition formulas in accordance with some embodiments;

FIGS. 5A and 5B illustrate fast Fourier transform (FFT) spectrums of sine waveform outputs of a conventional look up table (LUT) phase-to-amplitude converter and the disclosed Math-Tree phase-to-amplitude converter architecture, respectively;

FIGS. 6A-1 and 6A-2 illustrates a block diagram of a sixteen-bit phase word phase to accumulator with four hierarchical stages in accordance with an embodiment;

FIGS. 6B-1 and 6B-2 illustrates a block diagram of a sixteen-bit phase word phase to accumulator with three hierarchical stages and pre-computation in accordance with an embodiment;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely waveform generators, and more particularly, numerically controlled oscillators. Some of the various embodiments described herein include numerically controlled oscillators, phase-to-amplitude converters for numerically controlled oscillators, and phase-to-amplitude converters with pre-computation for numerically controlled oscillators. In other embodiments, aspects may also be applied to other applications involving any type of waveform generator circuit according to any fashion as known in the art.

In general terms, using embodiments of the present disclosure, phase-to-amplitude converters for numerically controlled oscillators are enhanced by utilizing a flexible architecture that avoids look-up tables stored in read-only memory, which can be a bottleneck in phase-to-amplitude converters. In particular, the present disclosure utilizes an architecture for a phase-to-amplitude converter that comprises mainly of multipliers and adders that are used to implement a global angle addition formula structure. The disclosed architecture provides increased performance over the prior architectures utilizing look-up tables stored in memory. Further, the disclosed architecture provides flexibility to enable the circuit designer to make choices regarding trade-offs between area required for the circuit and the precision of the phase-to-amplitude converter that were not previously available to the designer. For example, the disclosed architecture allows the circuit designer to have a choice between the number of hierarchical stages and input multiplexer complexity. Further, the disclosed architecture does not have strong limitations in phase word width, which limits the negative truncation phase modulation effect.

A numerically controlled oscillator (NCO) is a digital signal generator which creates a synchronous (i.e. clocked), discrete-time, discrete-valued representation of a waveform, usually sinusoidal. NCOs are often used in conjunction with a digital-to-analog converter (DAC) at the output to create a direct digital synthesizer (DDS).

Numerically controlled oscillators are used in many communications systems including digital up/down converters used in wireless and software radio systems, digital PLLs, radar systems, drivers for optical or acoustic transmissions, and multilevel FSK/PSK modulators/demodulators. Further, numerically controlled oscillators can be used for digital quadrature modulation for communication systems.

Figures 1, 6A:
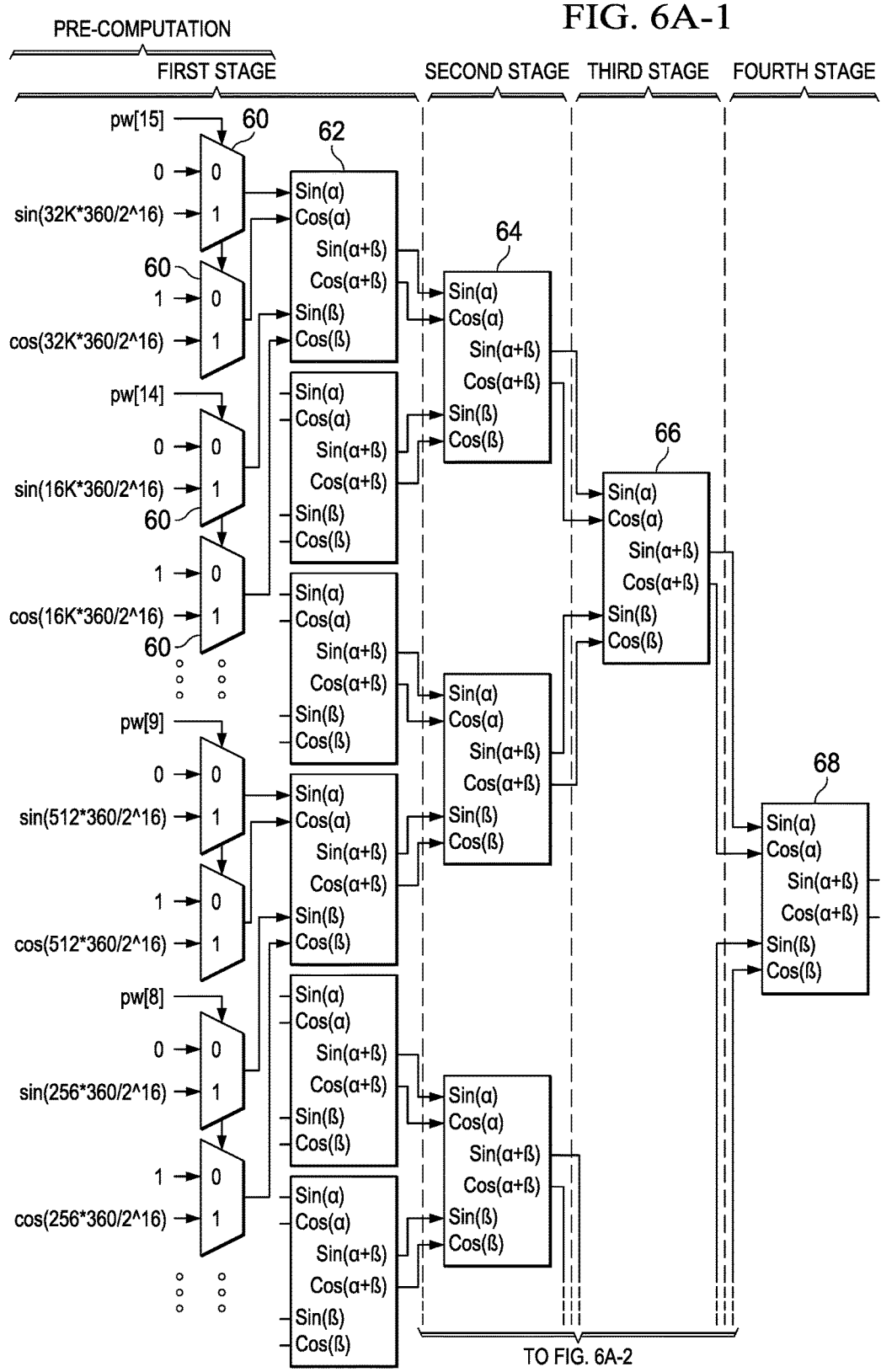
Figures 2, 6A:
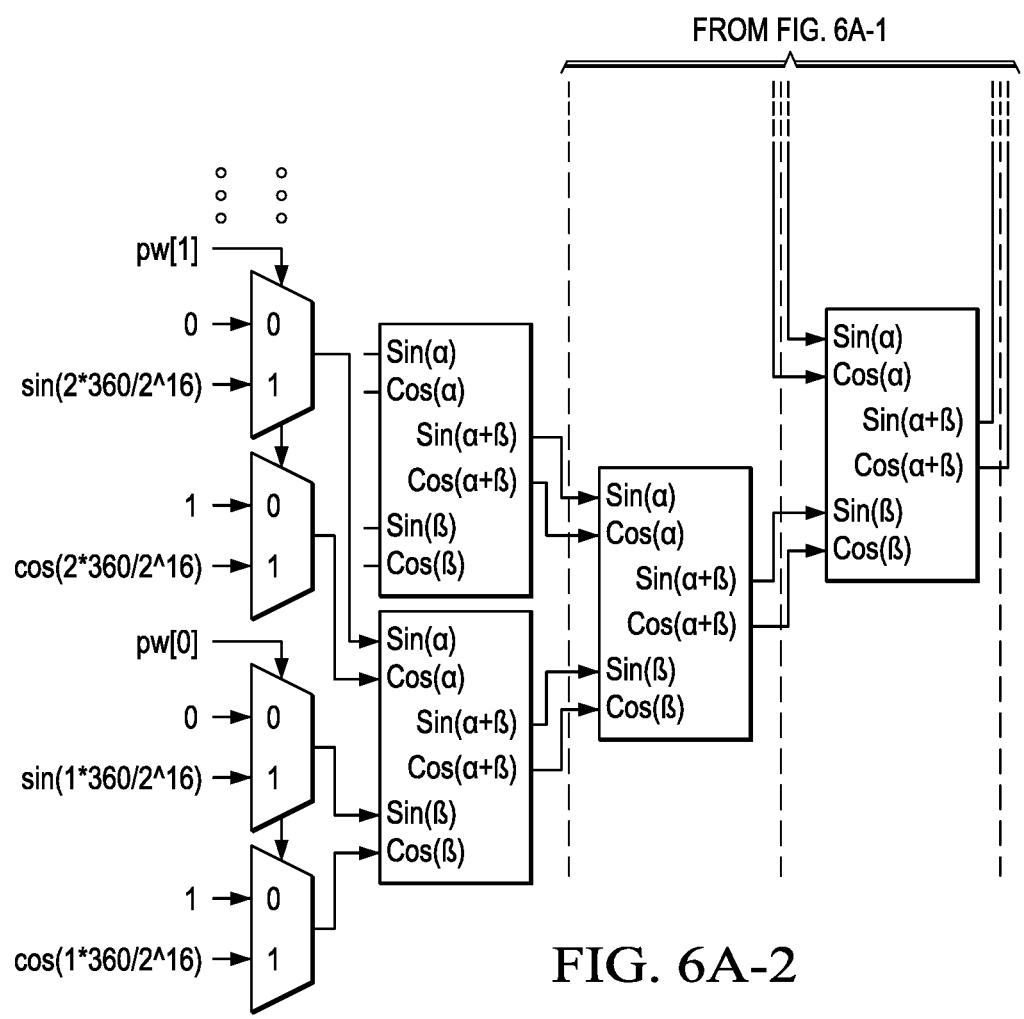

FIG. 1 is a block diagram of a numerically controlled oscillator 10 in accordance with an embodiment. The numerically controlled oscillator 10 includes a phase accumulator 12 in communication with a phase-to-amplitude converter 14. The phase accumulator 12 is configured to receive an input value 16 (sometimes referred to as a frequency control word (FCW)) and a reference clock 18. The FCW 16 may be a value stored in a register that is input to an adder 22. The phase accumulator 12 uses the input value 16 and a reference clock 18 to generate a phase word 20 representing the phase angle of the input value 16. The phase accumulator 12 includes of an adder 22 for summing together the input value 16 and a phase word 20 output of the phase accumulator 12 to create the saw-tooth waveform of the phase word 20. The phase accumulator 12 includes a storage unit 24, such as a flip-flop, for storing the phase value represented by the phase word 20 generated by the phase accumulator 12.

The storage unit 24 illustrated in the schematic is actually more than one storage units working in parallel and clocked by the same reference clock 18. The adder 22 before the storage unit 24 increases the value of the phase word 20 by the value of the input value 16 so, the phase accumulator 12 behaves as a numeric saw-tooth generator where the period is defined by the input value 16 and the falling edge is due to the wraparound effect of this counter (adder plus storage units). The number of storage units 24 as well as the input value 16 register width define the precision of the saw-tooth generator frequency.

The phase accumulator 12 produces the phase word 20 that includes the previous phase word 20 obtained from the storage unit 24 summed with the input value 16. The resulting phase word 20 is a discrete waveform and provides discrete instances of the phase word 20 representing a phase angle. The implementation of the phase accumulator 12 may vary. For instance, the previous example of the components of the phase accumulator 12 may be embodied by various hardware and/or software configurations.

The phase word 20 representing the phase angle of the input value 16 is input into to the phase-to-amplitude converter 14. The phase-to-amplitude converter 14 generates two 90 degree shifted waveforms as converter output signals 30. A sine phase-to-amplitude converter (PAC) 26 generates the sine waveform and a cosine PAC 28 generates the cosine waveform. The sine and cosine waveform values represented by the converter output signals 30 are approximately equal to a sine and cosine values at the phase angle represented by the phase word 20 within a predefined tolerance.

The sine PAC 26 and the cosine PAC 30 can include look-up tables usually implemented in read-only memories. In these embodiments, the phase word 20 addresses the memory (e.g. look-up tables) and each memory, entry by entry, defines the value of the sinusoid for each quantization value. In other words, this memory converts the input saw-tooth 20 to sinusoids.

The number of phase accumulator bits of a numerically controlled oscillator can be quite high (48, 64, etc.) If the phase word 20 is used directly to index the look-up table, a huge amount of storage capacity in the read-only memory would be required. For this reason, the phase word 20 may be truncated to stay in a reasonable memory space. Truncation of the phase word 20 causes phase modulation of the output signals 30 introducing non-harmonic distortion in proportion to the number of the truncated bits. In some embodiments discussed below, less bits of the phase word 20 can be truncated due to the architecture of the disclosed phase-to-amplitude converter, which reduces the non-harmonic distortion of the output signals 30. Indeed, the truncation of the phase word 20 could be potentially avoided altogether depending on the choices made by the circuit designer involving the trade-off between complexity (more hierarchical stages and more area) and the benefits of more precision.

The remainder of the disclosure provides exemplary embodiments and examples of high-performance phase-to-amplitude converters that are capable of generating highly accurate sine/cosine waveforms based on a phase word 20 (see FIGS. 2A-4 and 6A-6B) utilizing a hierarchical tree structure (may also be referred to as a Math-Tree structure).

The phase word 20, defining the phase (angle) of the output signals 30 generated by the phase-to-amplitude converter 14, is represented by a predefined number of bits. Each bit of the phase word 20 has a different weight in the angle definition (e.g. using regular binary coding) from the least significant bit (LSB) (e.g. bit 0) to the most significant bit (MSB) (bit n where the phase word has n bits). In an embodiment with a phase word 20 with n bits, the 360 degrees of the needed sinusoid is described by $2^n$ values. The angular weight of each bit (o through n) of the phase word (pw) 20 is described with the following equations 1, 2, and 3.

$$pw[0]=360/2^n \text{ degrees} \qquad \text{Equation (1)}$$

$$pw[m]=2^m*360/2^n \text{ degrees} \qquad \text{Equation (2)}$$

$$pw[n-1]=2^{(n-1)}*360/2^n \text{ degrees}=180 \text{ degrees} \qquad \text{Equation (3)}$$

When the 'm' bit of the phase word is 'one' the corresponding angular weight contributes to the computation of the sin/cos output value. When the 'm' bit is 'zero' the corresponding angular weight does not contribute to the computation of the sin/cos output value.

By utilizing Equations 1, 2, and 3 to calculate the sine and cosine value of the angle defined by each bit of phase word 20, the sine and cosine value of the whole angle can be calculated using angle addition formulas (see FIG. 2A discussed below). Since the angle addition formulas work on just two sets of input parameters, a "hierarchical tree" of these formulas can been created to combine all the bits of the phase word 20.

FIGS. 2A, 2B, and 2C illustrate angle addition formulas and block diagrams of the angle addition formulas in accordance with some embodiments. These angle addition formulas illustrated in FIG. 2A form the building blocks of the hierarchical tree structure in the phase-to-amplitude structures in the present disclosure. The angle addition formulas in FIG. 2A are sometimes referred to as trigonometric identities.

FIG. 2B illustrates a graphical representation of the angle addition formulas in FIG. 2A using multipliers 42A and 42B and adders 44A and 44B to create a sum-of-product building block 40. The sum-of-product building block 40 has $\sin(\alpha)$, $\cos(\alpha)$, $\sin(\beta)$, and $\cos(\beta)$ as inputs and outputs $\sin(\alpha+\beta)$ and $\cos(\alpha+\beta)$. FIG. 2C illustrates a simplified representation of the sum-of-product building block 40.

Figure 3A:
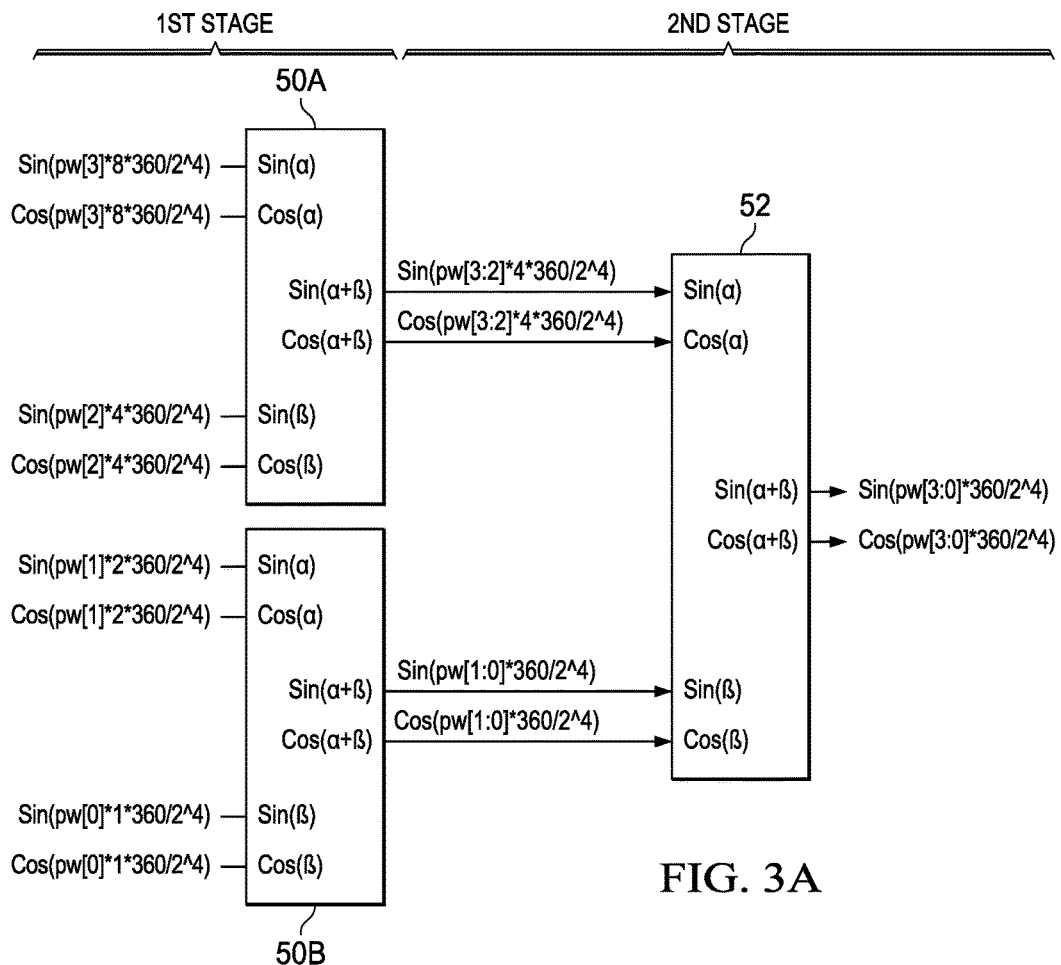
FIG. 3A illustrates a block diagram of a four-bit phase word phase-to-amplitude converter with two hierarchical stages in accordance with an embodiment.

FIG. 3A illustrates a block diagram of a Math-Tree phase-to-amplitude converter with two hierarchical stages (sometimes referred to as sum-of-product stages) and a four-bit phase word in accordance with an embodiment. An example with four phase word (pw) bits will be discussed to help illustrate the operation of a hierarchical tree of angle addition formulas. A first hierarchical stage of angle addition formulas (see first stage of FIG. 3A) will calculate the least significant bits (e.g. bits 0 and 1) and the most significant bits (e.g. bits 2 and 3) separately. The results from the first stage of angle addition formulas will then be combined in a second stage of angle of addition formulas (see second stage in FIG. 3A) to calculate the sine and cosine of the combined bits 0 through 3.

Figure 3B:
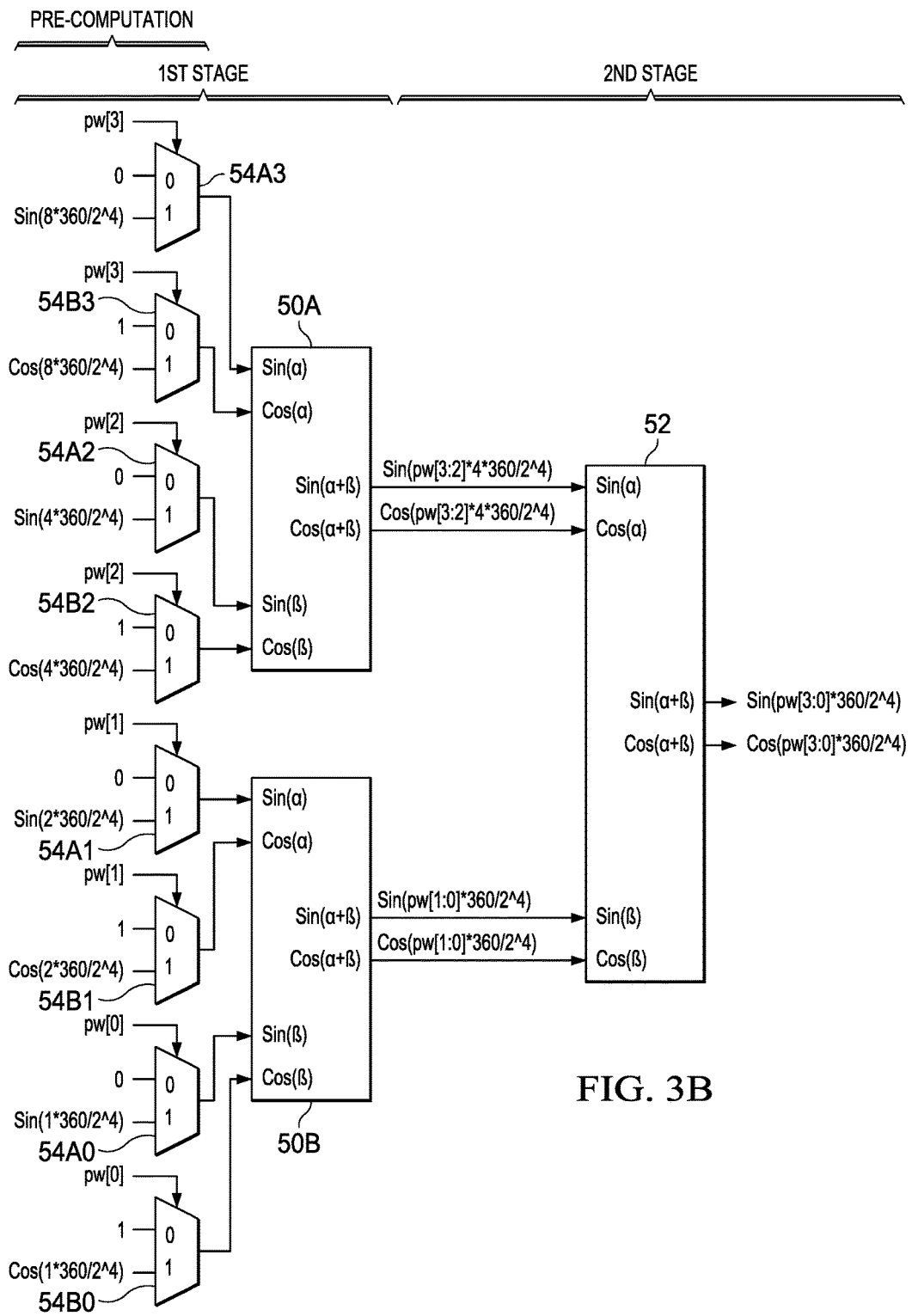
FIG. 3B illustrates a block diagram of a four-bit phase word phase-to-amplitude converter with two hierarchical stages and some pre-computation in accordance with another embodiment.
Figure 3C:
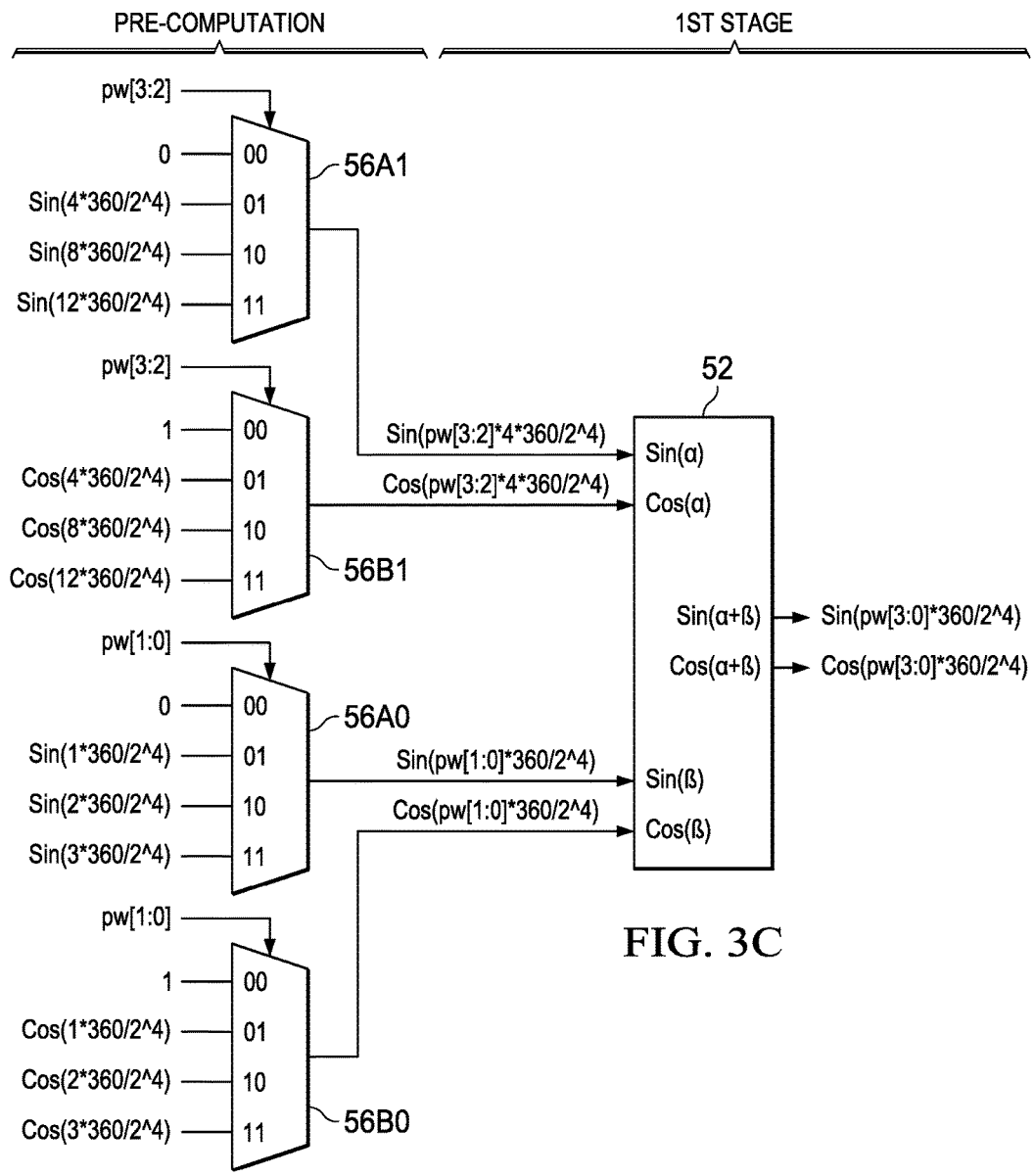
FIG. 3C illustrates a block diagram of a four-bit phase word phase-to-amplitude converter with one hierarchical stage and pre-computation in accordance with an embodiment.

Although the example embodiments of FIGS. 3A, 3B, and 3C illustrate a phase-to-amplitude architecture with only a four-bit phase word, this is to simplify the explanation of the architecture. The architecture may be scaled and utilized with other bit length phase words (see, e.g., FIGS. 6A-6B) that are more practical to current applications of NCO's.

The first stage of angle of addition formulas are as follows in Equations 4, 5, 6, and 7.

$$\sin(pw[3:2]*4*360/2^4)=\sin(pw[3]*8*360/2^4)*\cos(pw[2]*4*360/2^4)+\cos(pw[3]*8*360/2^4)*\sin(pw[2]*4*360/2^4) \quad \text{Equation (4)}$$

$$\cos(pw[3:2]*4*360/2^4)=\cos(pw[3]*8*360/2^4)*\cos(pw[2]*4*360/2^4)-\sin(pw[3]*8*360/2^4)*\sin(pw[2]*4*360/2^4) \quad \text{Equation (5)}$$

$$\sin(pw[1:0]*360/2^4)=\sin(pw[1]*2*360/2^4)*\cos(pw[0]*1*360/2^4)+\cos(pw[1]*2*360/2^4)*\sin(pw[0]*1*360/2^4) \quad \text{Equation (6)}$$

$$\cos(pw[1:0]*360/2^4)=\cos(pw[1]*2*360/2^4)*\cos(pw[0]*1*360/2^4)-\sin(pw[1]*2*360/2^4)*\sin(pw[0]*1*360/2^4) \quad \text{Equation (7)}$$

The first stage of angle addition formulas are illustrated in the first stage of FIG. 3A. The first stage in FIG. 3A includes two sum-of-product building blocks 50A and 50B, with building block 50A calculating the sine and cosine of the most significant bits and building block 50B calculating the sine and the cosine least significant bits.

The results of Equations 4, 5, 6, and 7 are then combined in the following Equations 8 and 9 to calculate the sine and cosine of the whole four-bit phase word (pw[3:0]).

$$\sin(pw[3:0]*360/2^4)=\sin(pw[3:2]*4*360/2^4)*\cos(pw[1:0]*360/2^4)+\cos(pw[3:2]*4*360/2^4)*\sin(pw[1:0]*360/2^4) \quad \text{Equation (8)}$$

$$\cos(pw[3:0]*360/2^4)=\cos(pw[3:2]*4*360/2^4)*\cos(pw[1:0]*360/2^4)-\sin(pw[3:2]*4*360/2^4)*\sin(pw[1:0]*360/2^4) \quad \text{Equation (9)}$$

The second stage of angle addition formulas are illustrated in the second stage of FIG. 3A. The second stage in FIG. 3A includes a sum-of-product building blocks 52, with building block 52 calculating calculate the sine and cosine of all of the bits in the phase word (pw[0:3]).

The architecture illustrated in FIG. 3A represents the baseline embodiment of the present disclosure with any optimization of the hierarchical tree of angle addition formulas. For example, FIGS. 3B and 3C illustrate two optimizations of the architecture illustrated in FIG. 3A.

It is important to note that the input values sin(pw[3]), sin(pw[2]), sin(pw[1]), sin(pw[0]), cos(pw[3]), cos(pw[2]), cos(pw[1]), cos(pw[0]) (with the related weight) do not have to be stored in any memory location. This is because these values are based on binary constants, and thus, are bit by bit, binary constant values that the circuit designer/logic synthesizer can heavily optimize.

For example, when the phase word bit is one value, the input sine value, for that specific bit, will be a binary constant defined by $\sin(b*360/2^n)$, where b is the binary weight of the specific bit position in the phase word and n is the phase word data width. Similarly, when the bit is a one value, the input cosine value, for that specific bit, will be the constant defined by $\cos(b*360/2^n)$, where b is the binary weight of the specific bit position in the phase word and n is the phase word data width.

Further, when the phase word bit is a zero value, the input sine value, for that specific bit, will be zero (e.g., sin(0)=0). When, when the bit is a zero value, the input cosine value, for that specific bit, will be one (e.g., cos(0)=1).

Hence, the sine and cosine values of the inputs can be considered constants, an input multiplexer can be utilized, as well as the multipliers of the first hierarchical stage, and both can be optimized the circuit designer/logic synthesizer to simplify the architecture without requiring any values to be stored in memory or look-up tables.

Referring to FIG. 3B, a block diagram of Math-Tree phase-to-amplitude converter with a four-bit phase word, two hierarchical stages, and some optimization in accordance with an embodiment is illustrated. This embodiment is similar to the embodiment in FIG. 3A except that the first stage of the hierarchical tree has some optimization with a Pre-Computation section within the first stage of the hierarchical tree. The second stage of the hierarchical tree of FIG. 3B is similar to the second stage of the hierarchical tree in FIG. 3A and the description will not be repeated herein. Details regarding this embodiment that are similar to those for the previously described embodiment will not be repeated herein.

In FIG. 3B, the first stage of the hierarchical tree includes a Pre-Computation section with multiplexers 54 (shown as multiplexers 54A0, 54B0, 54A1, 54B1, 54A1, 54B1, 54A3, and 54B3) for simplifying and pre-computing the input value calculations. In this embodiment, the Pre-Computation section includes two multiplexers 54 for every bit of the phase word.

Multiplexers labelled as 54Ax with the "x" representing the bit position of the bit in the phase word pre-compute the sine values of the bits of the phase word. For example, the multiplexer 54A0 pre-computes the sine value of the bit 0 of the phase word, and this result is input into the sin(β) input of the sum-of-product building block 50B in the first stage of the hierarchical tree. The bit 0 of the phase word (shown as pw[0] in FIG. 3B) is coupled to the select input of the multiplexor 54A0. The input 0 of the multiplexer 54A0 is coupled to a constant 0 value (e.g. sin(0)=0) and the input 1 of the multiplexer 54A0 is coupled to a constant value of sin(1*360/2^4) (note that this constant value is determined using the Equations 1, 2, and 3, described above). The other multiplexers 54A1, 54A2, and 54A3 are configured in a similar manner as the multiplexer 54A0 with the bit value being coupled to the select input of the corresponding multiplexer, a constant 0 value being coupled to the input 0, and a constant sin(n*360/2^4) with n being the bit position of the bit in the phase word. The results of these multiplexers are input into the corresponding sin(α) or sin(β) input of the corresponding sum-of-product building block 50A or 50B in the first stage of the hierarchical tree.

Multiplexers labelled as 54Bx with the "x" representing the bit position of the bit in the phase word pre-compute the cosine values of the bits of the phase word. For example, the multiplexer 54B0 pre-computes the cosine value of the bit 0 of the phase word, and this result is input into the cos(β) input of the sum-of-product building block 50B in the first stage of the hierarchical tree. The bit 0 of the phase word (shown as pw[0] in FIG. 3B) is coupled to the select input of the multiplexor 54B0. The input 0 of the multiplexer 54B0 is coupled to a constant 1 value (e.g. cos(0)=1) and the input 1 of the multiplexer 54A0 is coupled to a constant value of cos(1*360/2^4) (note that this constant value is determined using the Equations 1, 2, and 3, described above). The other multiplexers 54B1, 54B2, and 54B3 are configured in a similar manner as the multiplexer 54B0 with the bit value being coupled to the select input of the corresponding multiplexer, a constant 1 value being coupled to the input 0, and a constant cos(n*360/2^4) with n being the bit position of the bit in the phase word. The results of these multiplexers are input into the corresponding cos(α) or cos(β) input of the corresponding sum-of-product building block 50A or 50B in the first stage of the hierarchical tree.

FIG. 3C illustrates a block diagram of Math-Tree phase-to-amplitude converter with a four-bit phase word, one hierarchical stage, and pre-computation in accordance with an embodiment. This embodiment is similar to the embodiment in FIG. 3B except that more optimization has been done such that the first stage of the hierarchical tree in FIG. 3B has been completely replaced with a Pre-Computation section, and thus, the hierarchical tree only has one stage. The first stage of the hierarchical tree of FIG. 3C is similar to the second stage of the hierarchical tree in FIG. 3B and the description will not be repeated herein. Details regarding this embodiment that are similar to those for the previously described embodiment will not be repeated herein.

In FIG. 3C, the Pre-Computation section includes multiplexers 56 (shown as multiplexers 56A0, 56B0, 56A1, and 56B1) for simplifying and pre-computing the input value calculations. In this embodiment, the Pre-Computation section includes one multiplexer 56 for each input to the sum-of-product building block 52 in the first stage of the hierarchical tree.

Multiplexers labelled as 56A0 and 56A1 pre-compute the sine values of the bits of the phase word with the bits of the phase word split between the two multiplexers. For example, the multiplexer 56A0 pre-computes the sine values of the bits 0 and 1 of the phase word, and this result is input into the sin(β) input of the sum-of-product building block 52 in the first stage of the hierarchical tree, and the multiplexer 56A1 pre-computes the sine values of the bits 2 and 3 of the phase word, and this result is input into the sin(α) input of the sum-of-product building block 52 in the first stage of the hierarchical tree.

The bits 0 and 1 of the phase word (shown as pw[1:0] in FIG. 3C) are coupled to the select input of the multiplexor 56A0. The input 00 of the multiplexer 56A0 is coupled to a constant 0 value (e.g. sin(0)=0), the input 01 of the multiplexer 56A0 is coupled to a constant value of sin(1*360/2^4), the input 10 of the multiplexer 56A0 is coupled to a constant value of sin(2*360/2^4), and the input 11 of the multiplexer 56A0 is coupled to a constant value of sin(3*360/2^4) (note that these constant values are determined using the Equations 1, 2, and 3, described above). The multiplexer 56A1 is configured in a similar manner as the multiplexer 56A0 with the bit values 2 and 3 being coupled to the select input of the multiplexer 56A1, a constant 0 value being coupled to the input 00, and constants sin(n*360/2^4) with n being the bit position of the bit in the phase word.

Multiplexers labelled as 56B0 and 56B1 pre-compute the cosine values of the bits of the phase word with the bits of the phase word split between the two multiplexers. For example, the multiplexer 56B0 pre-computes the sine values of the bits 0 and 1 of the phase word, and this result is input into the cos(β) input of the sum-of-product building block 52 in the first stage of the hierarchical tree, and the multiplexer 56A1 pre-computes the sine values of the bits 2 and 3 of the phase word, and this result is input into the cos(α) input of the sum-of-product building block 52 in the first stage of the hierarchical tree.

The bits 0 and 1 of the phase word (shown as pw[1:0] in FIG. 3C) are coupled to the select input of the multiplexor 56B0. The input 00 of the multiplexer 56B0 is coupled to a constant 1 value (e.g. cos(0)=1), the input 01 of the multiplexer 56B0 is coupled to a constant value of cos(1*360/2^4), the input 10 of the multiplexer 56B0 is coupled to a constant value of cos(2*360/2^4), and the input 11 of the multiplexer 56B0 is coupled to a constant value of cos(3*360/2^4) (note that these constant values are determined using the Equations 1, 2, and 3, described above). The multiplexer 56B1 is configured in a similar manner as the multiplexer 56B0 with the bit values 2 and 3 being coupled to the select input of the multiplexer 56B1, a constant 1 value being coupled to the input 00, and constants cos(n*360/2^4) with n being the bit position of the bit in the phase word.

The embodiment in FIG. 3C operates in a similar manner to the embodiments of FIGS. 3B and 3A, but provides advantages in terms of the amount of area needed to implement the embodiment. In particular, the embodiment in FIG. 3C requires about half of the area required for the embodiment of FIG. 3A due to the Pre-Computation section eliminating the need for one of the hierarchical stages.

As seen in the example embodiments of FIGS. 3A, 3B, and 3C, the Math-Tree phase-to-amplitude converters disclosed herein comprise multipliers and adders that are used to implement a global angle addition formula structure. This Math-Tree architecture does not require indexing and addressing look-up tables stored in memory, and thus, provides increased performance and flexibility over architectures utilizing look-up tables stored in memory.

Specifically, the flexibility at the input stage of the hierarchical structure can allow for the circuit designer/logic synthesizer to make decisions regarding, for example, the trade-off between area required to implement the circuit and the precision of the circuit. These types of trade-offs were not available in the prior architectures utilizing look-up tables because the precision of the phase-to-amplitude converter was often limited due to the truncation of the phase word, which was required to stay within a reasonable amount of memory space, input to the phase-to-amplitude converter. However, as illustrated in the table below, the phase word of the Math-Tree phase-to-amplitude converters can be increased by adding another hierarchical stage, adding more pre-computation, or both. For example, the number of bits in the phase word that is input to the Math-Tree phase-to-amplitude converters can be doubled by simply adding one hierarchical (sum-of-product) stage.

| Phase word bits | Hierarchical Stages with 2-way input selector | Hierarchical Stages with 4-way input selector | Hierarchical Stages with 16-way input selector |
| --- | --- | --- | --- |
| 4 | 2 (e.g. FIG. 3B) | 1 (e.g. FIG. 3C) | 0 |
| 8 | 3 | 2 | 1 |
| 16 | 4 (e.g. FIG. 6A) | 3 (e.g. FIG. 6B) | 2 |
| 32 | 5 | 4 | 3 |
| 64 | 6 | 5 | 4 |

Although the example embodiments of FIGS. 3A, 3B, and 3C illustrate a phase-to-amplitude architecture with a four-bit phase word, the architecture may be scaled and utilized with other bit length phase words (see, e.g., FIGS. 6A-6B), such a, 8-bit phase words, 16-bit phase words, 32-bit phase words, 64-bit phase words, and so on.

Figure 4:
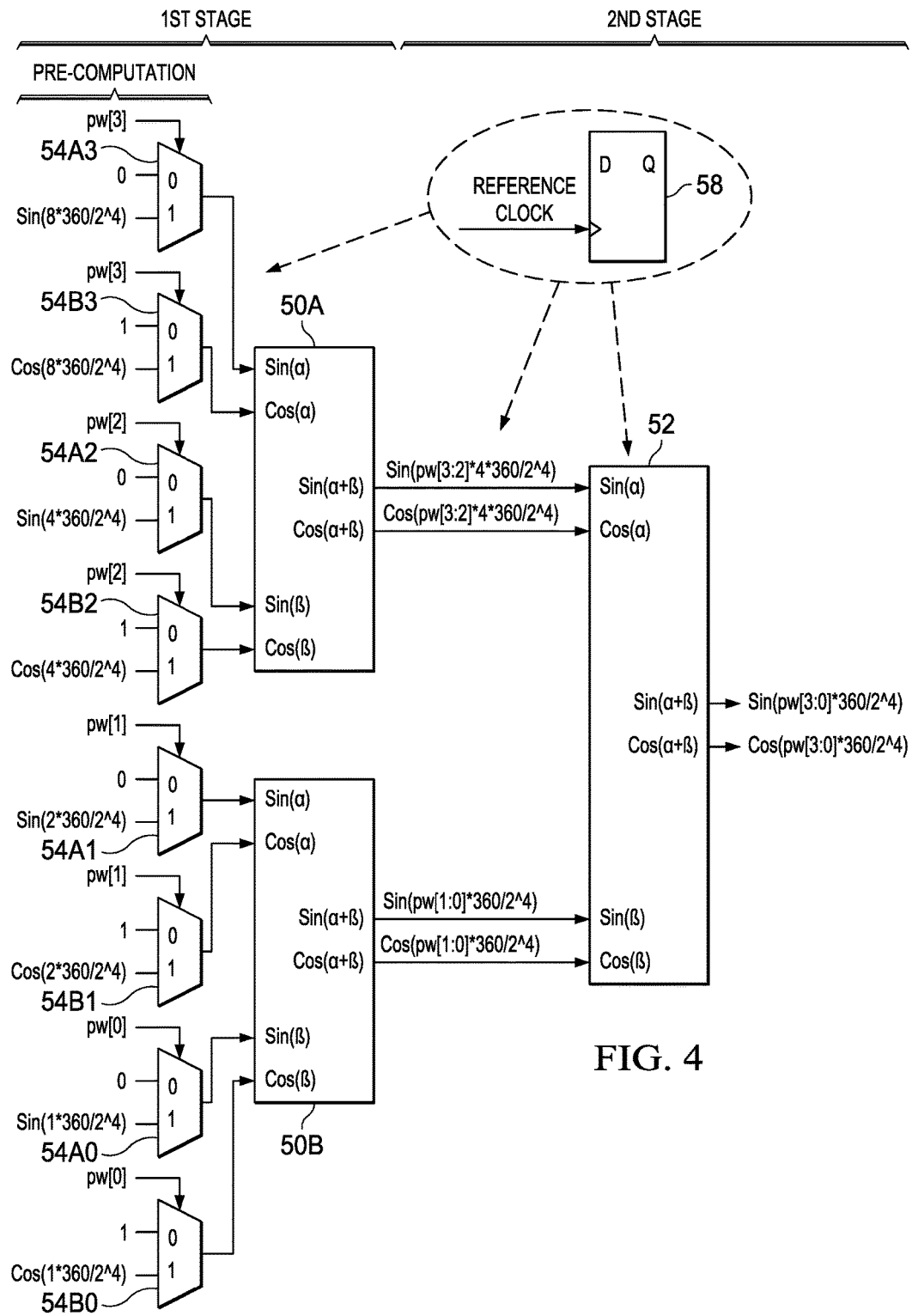
FIG. 4 illustrates a block diagram of a pipelined four-bit phase word phase-to-amplitude converter with two hierarchical stage in accordance with some embodiment.

FIG. 4 illustrates a block diagram of a pipelined Math-Tree phase-to-amplitude converter with two hierarchical stages in accordance with some embodiment. This embodiment is similar to the embodiment in FIG. 3B except that this embodiment illustrates where sampling stages can be inserted to achieve a pipelined architecture as described below. Details regarding this embodiment that are similar to those for the previously described embodiment will not be repeated herein.

The embodiment of FIG. 4 illustrates that flip-flops 58 can be inserted at various locations in the Math-Tree phase-to-amplitude converter to improve the performance of the converter. For example, the pipelining flip-flops 58 can be inserted between the input multiplexers 54 and sum-of-product building blocks 50, between the various hierarchical stages (e.g. first stage and second stage of FIG. 4), between the multipliers and the adders in the sum-of-product building blocks 50 and 52 (see FIG. 2B), within each multiplier and within each adder in the sum-of-product building blocks 50 and 52, or a combination thereof. By pipelining the Math-Tree phase-to-amplitude converter, the converter's speed is only limited by the speed of the slowest stage/component rather than how long it takes for the whole process of converting from the input to the output of the converter. The granularity of the Math-Tree phase-to-amplitude converter allows for pipelining stages to be inserted at almost every level of the converter as opposed to the limited to no pipelining possible in prior architectures that utilized look-up tables and/or memory storage. The addition of pipelining stages to the Math-Tree phase-to-amplitude converter increases the converter latency, but latency is not as important to an NCO as speed because NCOs are free running sinewave generators.

FIGS. 5A and 5B illustrate fast Fourier transform (FFT) spectrums of sine waveform outputs of a look-up table (LUT) phase-to-amplitude converter and the disclosed Math-Tree phase-to-amplitude converter, respectively. The sine waveform considered for the FFT analysis is the waveform composed by all the 65536 different samples identified by the 16 bits wide phase word. Considering a 3.2 GHz sample rate, these 65536 samples describe a single period sine waveform oscillating at 48828.125 Hz (3.2*10^9/65536). The FFT spectrums illustrated in FIGS. 5A and 5B show that the Math-Tree phase-to-amplitude converter (FIG. 5B) has at least the same sine/cosine waveform quality output as the tradition LUT approach (FIG. 5A). For example, the spectrum and the ratio between the amplitude of the first harmonic and the higher ones is for both the LUT FFT and the Math-Tree FFT higher than 10^5. This shows that the output sine waveform of the Math-Tree solution, given the same phase word width, has at least the same purity as the pure LUT solution, and in some embodiments the Math-Tree architecture can have more precision than the pure LUT due to the ability to reduce the truncation of the phase word.

The configuration used in the LUT approach is as follows: 16 bits precision for the sine/cosine output waveform (numbers range −32768/32767), 16 bits wide input phase word, and 2^16×16 bit (1 Mbits) read-only memory. The maximum frequency that the phase-to-amplitude converter in the LUT configuration can operate at is ~550 megahertz (MHz). If the number of read-only memories is increased to two to split the least significant bits and the most significant bits of the phase word into separate read-only memories, then the maximum frequency that the phase-to-amplitude converter can operate at is ~750 MHz. The bottleneck of these LUT configurations is the read-only memory access time. The implementation used for the LUT configuration in these comparisons is a 28 nm fully depleted silicon on insulator (FDSOI) technology.

The configuration used in the Math-Tree phase-to-amplitude converter is as follows: 16 bits precision for the sine/cosine output waveform (numbers range −32768/32767), 16 bits wide input phase word, 24 bits wide input constants, inputs to adders/multiplexers are 24 bits wide, 3 hierarchical stages with an input stage that uses 4-input multiplexers, pipeline registers are inserted between each stage, between each multiplier/adder and also within the single multiplier/adder. The 24 bit wide input constants and the 24 bit wide adders and multiplexers were chosen overcome any error amplification at the stages. The final output values are then truncated down-to 16 bits to match the output width of the LUT solution. The maximum frequency that the phase-to-amplitude converter in the Math-Tree configuration can operate at is ~4.40 gigahertz (GHz). Even more advanced pipelining techniques can be utilized to achieve even higher frequencies. The implementation used for the Math-Tree configuration in these comparisons is a 28 nm FDSOI technology. Further, if the Math-Tree configuration is utilizing a FDSOI technology, then forward body biasing (FBB) could be implemented to achieve even higher frequencies. However, the FBB would not benefit the LUT configuration.

Figure 5C:
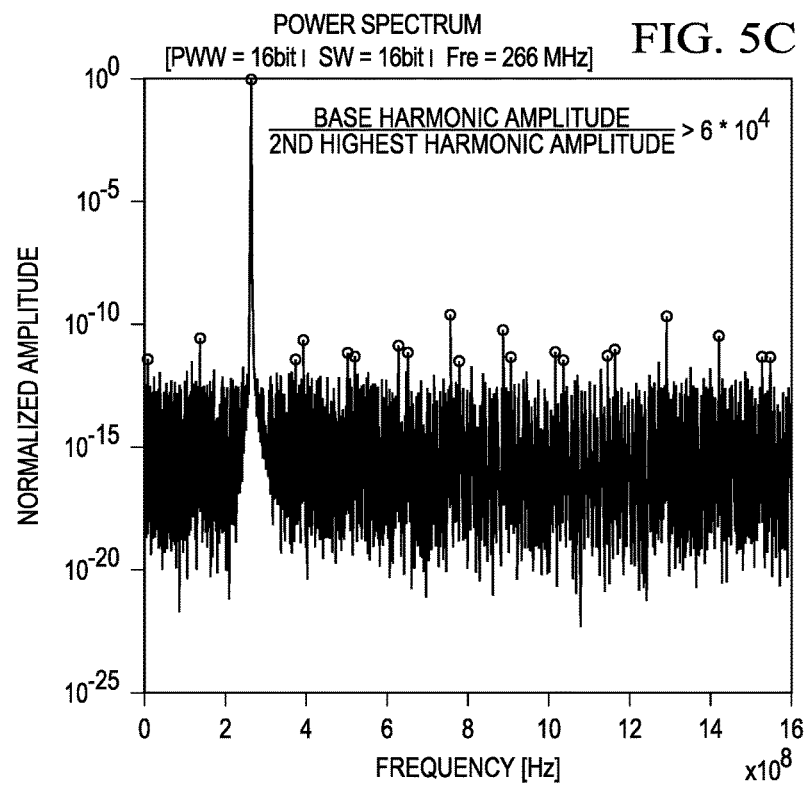
FIGS. 5C and 5D illustrate FFT spectrums of sine waveform outputs of the disclosed Math-Tree phase-to-amplitude converter, using a 16 bits wide phase word and a 20 bits wide phase word, respectively.
Figure 5D:
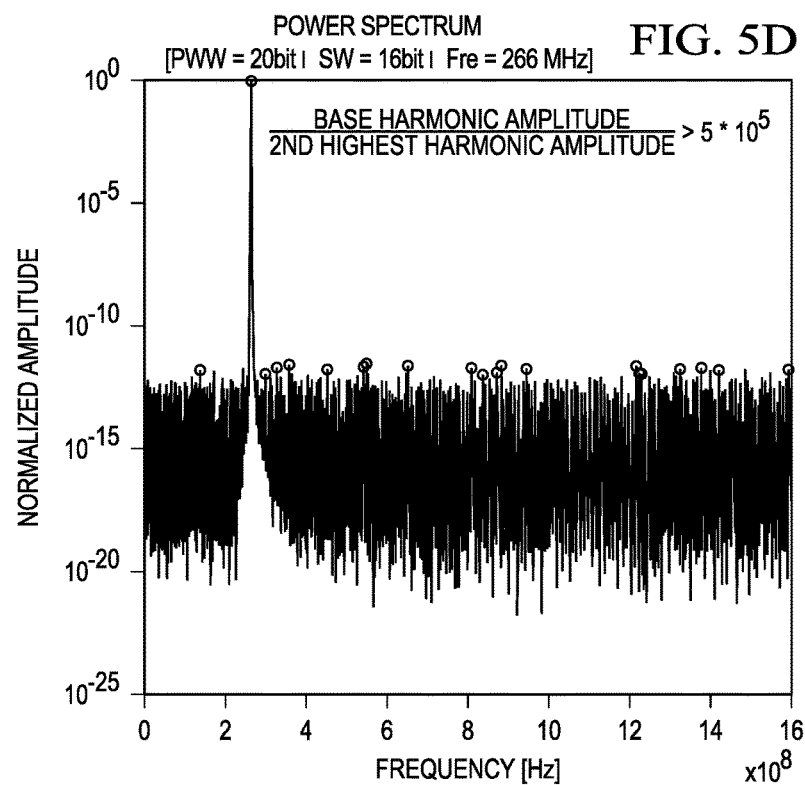

FIGS. 5C and 5D illustrate Fourier transform (FFT) spectrums of sine waveform outputs of the disclosed Math-Tree phase-to-amplitude converter, using a 16 bits wide phase word and a 20 bits wide phase word, respectively. The sine waveform considered for the FFT analysis is a 266 MHz waveform (at 3.2 GHz sample rate) generated using the Math-Tree phase-to-amplitude converter. The FFT spectrums illustrated in FIGS. 5C and 5D show that increasing the phase word width by 4 bits, the amplitude of the $2^{nd}$ highest harmonic decreases by a factor of about 10. This clearly shows the effect of the truncation of the phase word width: less truncated bits, as in the 20 bits wide phase word example, means higher output quality. Adding 4 bits to the phase word width increases the Math-Tree area by about ⅓. The reason that adding 4 bits to have a 20 bits width phase word increases the area by ⅓ is that a 20 bits wide phase word requires a 32 bit Math-Tree implementation. However, because 12 of the bits are always stuck at zero in this implementation, the architecture can be heavily optimized to drastically reduce the number of extra input multiplexers and sum-of-products blocks needed to implement the 20 bits wide phase word implementation. To achieve the same result using a common LUT approach, a huge 2^20×16 bit wide (16 Mbits) read only memory would be needed.

FIG. 6A illustrates a block diagram of a Math-Tree phase-to-amplitude converter with a sixteen-bit phase word, four hierarchical stages, and some optimization in accordance with an embodiment. This embodiment is similar to the embodiment in FIG. 3B except that this embodiment illustrates a sixteen-bit phase word and four hierarchical stages. Details regarding this embodiment that are similar to those for the previously described embodiment will not be repeated herein.

The first stage includes a pre-computation section with two-input multiplexers 60 that output to sum-of-product building blocks 62. The blocks 62 output to sum-of-product building blocks 64 in a second stage. The blocks 64 output to sum-of-product building blocks 66 in a third stage. The blocks 66 output to sum-of-product building blocks 68 in a fourth stage. The operation and configuration of this embodiment is similar to the embodiment of FIG. 3B except that it has more stages to accommodate a larger phase word.

Figures 1, 6B:
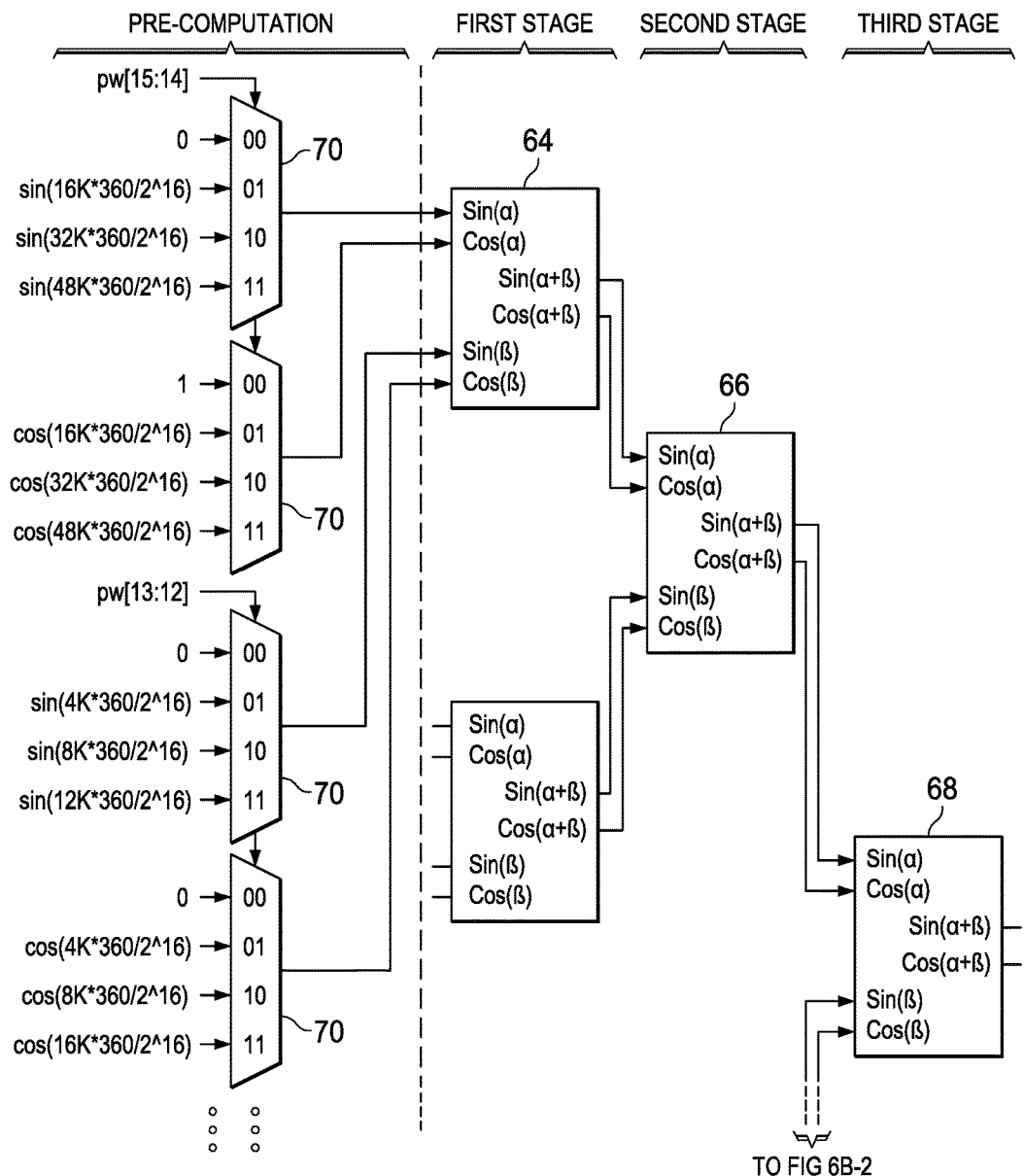
Figures 2, 6B:
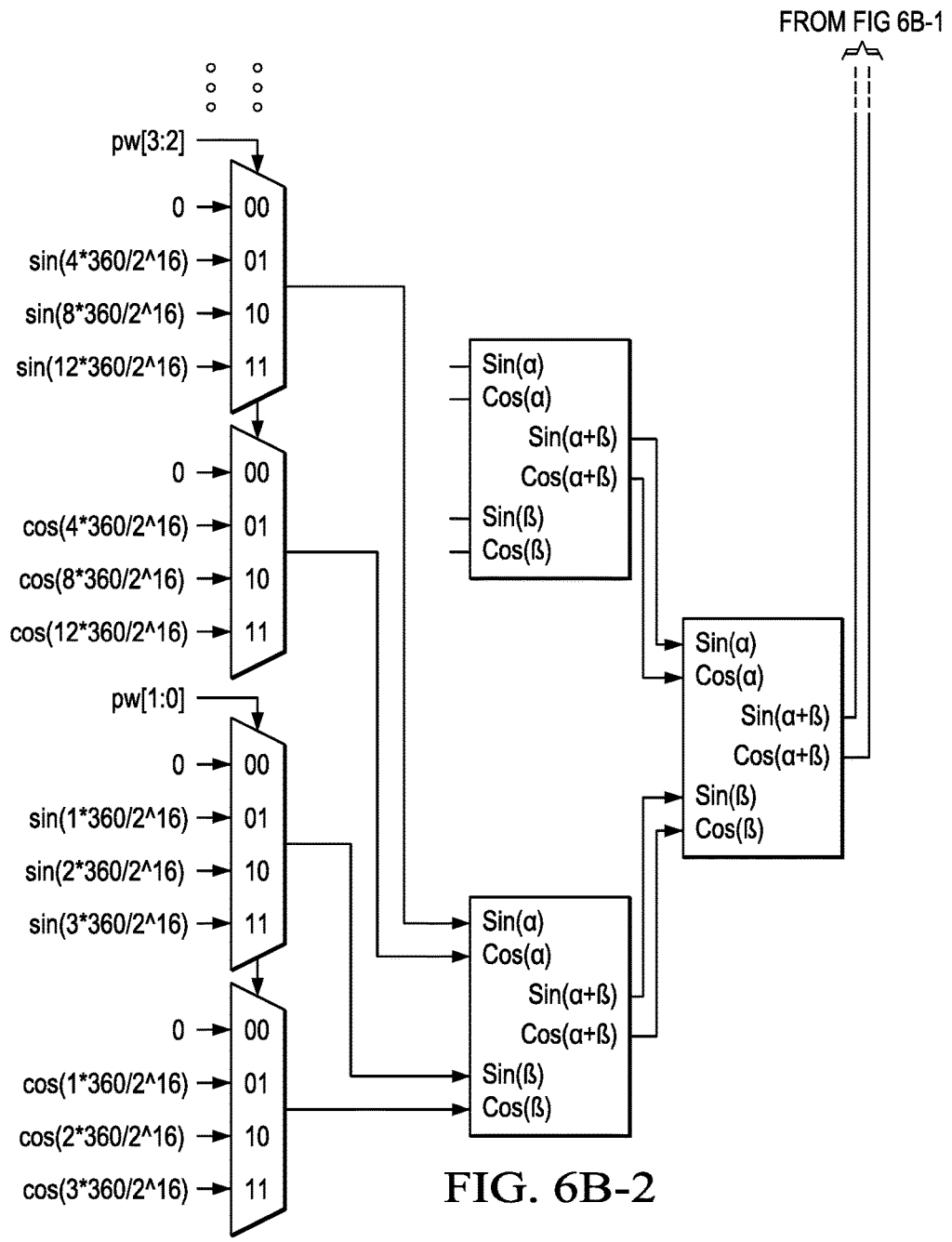

FIG. 6B illustrates a block diagram of a Math-Tree phase-to-amplitude converter with a sixteen-bit phase word, three hierarchical stages, and pre-computation in accordance with an embodiment. This embodiment is similar to the embodiment in FIG. 6A except that more optimization has been done such that the first stage of the hierarchical tree in FIG. 6A has been completely replaced with a Pre-Computation section, and thus, the hierarchical tree only has three stages. The first stage of FIG. 6B is similar to the second stage of FIG. 6A, the second stage of FIG. 6B is similar to the third stage of FIG. 6A, and the third stage of FIG. 6B is similar to the fourth stage of FIG. 6A. Details regarding this embodiment that are similar to those for the previously described embodiment will not be repeated herein.

The pre-computation section includes four-input multiplexers 70 that output to sum-of-product building blocks 64 in the first stage. The blocks 64 output to sum-of-product building blocks 66 in the second stage. The blocks 66 output to sum-of-product building blocks 68 in the third stage. The operation and configuration of this embodiment is similar to the embodiment of FIG. 3C and except that it has more stages to accommodate a larger phase word.

Figure 7:
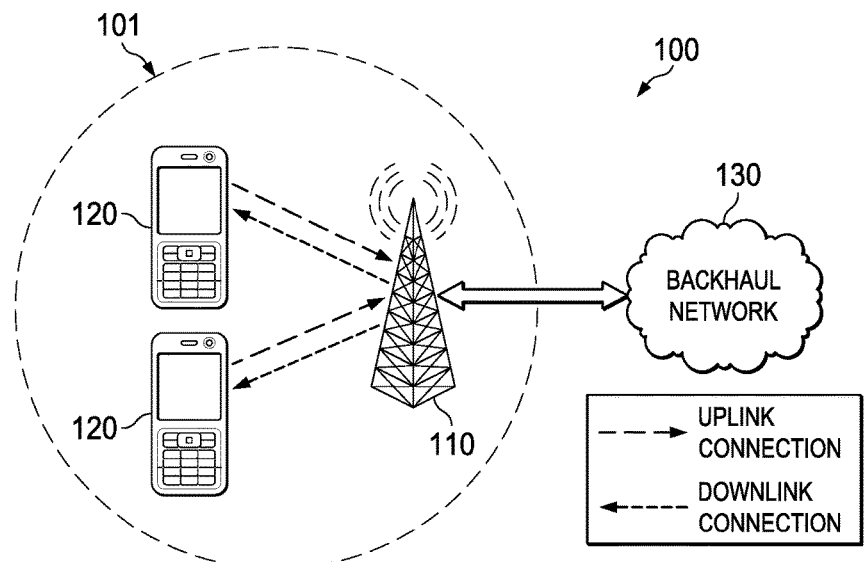
FIG. 7 illustrates a diagram of wireless communications network in accordance with an embodiment.

FIG. 7 illustrates a network 100 for communicating data. The network 100 comprises a base station no having a coverage area 101, a plurality of mobile devices 120, and a backhaul network 130. The base station no, the plurality of mobile devices 120, the backhaul network 130, or a combination thereof can utilize one or more phase-to-amplitude converters, which may be like the Math-Tree phase-to-amplitude converters illustrated in FIGS. 1, 3A-3C, 4, and 6A-6B.

As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 8:
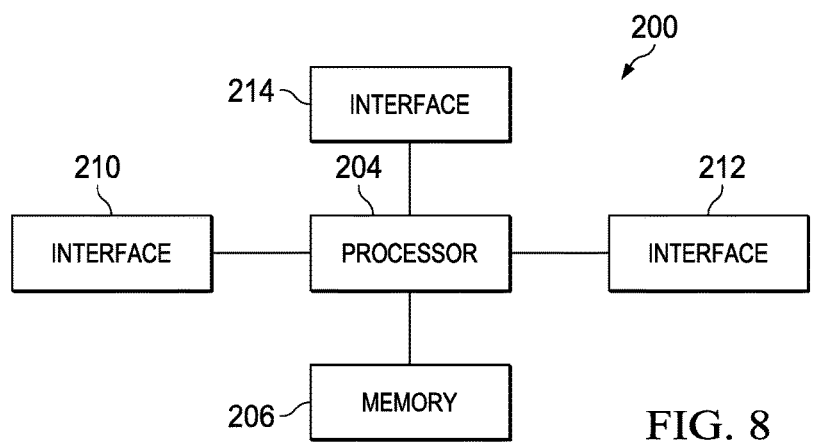
FIG. 8 illustrates a diagram of an processing system in accordance with an embodiment.

FIG. 8 illustrates a block diagram of an embodiment processing system 200 for that can employ a Math-Tree phase-to-amplitude converter, which may be like the Math-Tree phase-to-amplitude converters illustrated in FIGS. 1, 3A-3C, 4, and 6A-6B, and perform methods described herein. The processing system 200 may be installed in a host device. As shown, the processing system 200 includes a processor 204, a memory 206, and interfaces 210-214, which may (or may not) be arranged as shown in FIG. 8. The processor 204 may be any component or collection of components adapted to perform computations and/or other processing related tasks, and the memory 206 may be any component or collection of components adapted to store programming and/or instructions for execution by the processor 204. In an embodiment, the memory 206 includes a non-transitory computer readable medium. The interfaces 210, 212, 214 may be any component or collection of components that allow the processing system 200 to communicate with other devices/components and/or a user. For example, one or more of the interfaces 210, 212, 214 may be adapted to communicate data, control, or management messages from the processor 204 to applications installed on the host device and/or a remote device. As another example, one or more of the interfaces 210, 212, 214 may be adapted to allow a user or user device (e.g., personal computer (PC), etc.) to interact/communicate with the processing system 200. The processing system 200 may include additional components not depicted in FIG. 8, such as long term storage (e.g., non-volatile memory, etc.).

In some embodiments, the processing system 200 is included in a network device that is accessing, or part otherwise of, a telecommunications network. In one example, the processing system 200 is in a network-side device in a wireless or wireline telecommunications network, such as a base station, a relay station, a scheduler, a controller, a gateway, a router, an applications server, or any other device in the telecommunications network. In other embodiments, the processing system 200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
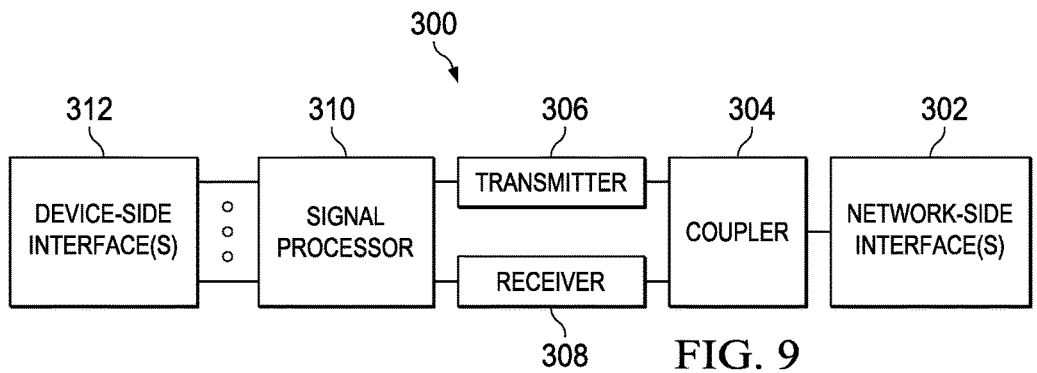
FIG. 9 illustrates a diagram of a transceiver in accordance with an embodiment.

In some embodiments, one or more of the interfaces 210, 212, 214 connects the processing system 200 to a transceiver adapted to transmit and receive signaling over the telecommunications network. FIG. 9 illustrates a block diagram of a transceiver 300 adapted to transmit and receive signaling over a telecommunications network. The transceiver 300 may be installed in a host device. As shown, the transceiver 300 comprises a network-side interface 302, a coupler 304, a transmitter 306, a receiver 308, a signal processor 310, and a device-side interface 312. The network-side interface 302 may include any component or collection of components adapted to transmit or receive signaling over a wireless or wireline telecommunications network. The coupler 304 may include any component or collection of components adapted to facilitate bi-directional communication over the network-side interface 302. The transmitter 306 may include any component or collection of components (e.g., up-converter, power amplifier, etc.) adapted to convert a baseband signal into a modulated carrier signal suitable for transmission over the network-side interface 302. The receiver 308 may include any component or collection of components (e.g., down-converter, low noise amplifier, etc.) adapted to convert a carrier signal received over the network-side interface 302 into a baseband signal. The signal processor 310 may include any component or collection of components adapted to convert a baseband signal into a data signal suitable for communication over the device-side interface(s) 312, or vice-versa. The device-side interface(s) 312 may include any component or collection of components adapted to communicate data-signals between the signal processor 310 and components within the host device (e.g., the processing system 200, local area network (LAN) ports, etc.).

The transceiver 300 may transmit and receive signaling over any type of communications medium. In some embodiments, the transceiver 300 transmits and receives signaling over a wireless medium. For example, the transceiver 300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 302 comprises one or more antenna/radiating elements. For example, the network-side interface 302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A waveform generator comprising:
  a phase accumulator configured to generate a digital phase signal representing a phase angle; and
  a phase-to-amplitude converter configured to receive the digital phase signal as a phase input, and generate sine and cosine waveform values as digital amplitude signals, wherein the phase-to-amplitude converter does not include a look-up table, wherein the phase-to-amplitude converter comprises:
    an input stage circuit configured to receive the digital phase signal, determine sine and cosine values of the digital phase signal, and output the determined sine and cosine values of the digital phase signal;

a calculating stage circuit having inputs coupled to outputs of the input stage circuit, the calculating stage circuit configured to calculate sine and cosine values based on the determined sine and cosine values output of the input stage circuit, the calculating stage circuit comprising multiple sum-of-products circuits, each of the multiple sum-of-products circuits comprising multipliers and adders; and an output stage circuit having inputs coupled to outputs of the calculating stage circuit, the output stage circuit configured to calculate sine and cosine values based on the determined sine and cosine values of the calculating stage circuit, the output stage circuit comprising a sum-of-products circuit, the sum-of-products circuit comprising multipliers and adders, the calculated sine and cosine values forming the digital amplitude signals.

2. The waveform generator of claim 1, wherein each of the sum-of-products circuits further comprises:
a first sine input node and a second sine input node configured to receive a first sine value and a second sine value, respectively;
a first cosine input node and a second cosine input node configured to receive a first cosine value and a second cosine value, respectively;
a first multiplier coupled to the first sine input node and the first cosine input node, the first multiplier configured to output the product of the first sine value and the first cosine value;
a second multiplier coupled to the second cosine input node and the second sine input node, the second multiplier configured to output the product of the second cosine value and the second sine value;
a third multiplier coupled to the second cosine input node and the first cosine input node, the third multiplier configured to output the product of the second cosine value and the first cosine value;
a fourth multiplier coupled to the first sine input node and the second sine input node, the fourth multiplier configured to output the product of the first sine value and the second sine value;
a first adder coupled to the outputs of the first and second multipliers, the first adder configured to output the sum of the output of the first multiplier and the output of the second multiplier; and
a second adder coupled to the outputs of the third and fourth multipliers, the second adder configured to output the difference of the output of the third multiplier and the output of the fourth multiplier.

3. The waveform generator of claim 1, wherein each of the sum-of-products circuits is configured to receive a sine value and a cosine value of a first value, receive a sine value and a cosine value of a second value, output a sine value of the first and second values combined, and output a cosine value of the first and second values combined.

4. The waveform generator of claim 1, wherein the input stage circuit further comprises:
a first sum-of-products circuit configured to receive at least one bit of the digital phase signal, the first sum-of-products circuit configured to calculate sine and cosine values of the at least one bit of the digital phase signal; and
a second sum-of-products circuit configured to receive at least one other bit of the digital phase signal, the second sum-of-products circuit configured to calculate sine and cosine values of the at least one other bit of the digital phase signal.

5. The waveform generator of claim 1, wherein the input stage circuit further comprises:
a first set of multiplexers configured to output first output values based on at least one bit of the digital phase signal, the first output values being sine and cosine values of the at least one bit of the digital phase signal;
a first sum-of-products circuit configured to receive the first output values, the first sum-of-products circuit configured to calculate sine and cosine values of the first output values;
a second set of multiplexers configured to output second output values based on at least one other bit of the digital phase signal, the second output values being sine and cosine values of the at least one other bit of the digital phase signal; and
a second sum-of-products circuit configured to receive the second output values, the second sum-of-products circuit configured to calculate sine and cosine values of the second output values.

6. The waveform generator of claim 1, wherein the input stage circuit further comprises:
a first set of multiplexers configured to select sine and cosine values of a first set of bits of the digital phase signal based on the first set of bits of the digital phase signal; and
a second set of multiplexers configured to select sine and cosine values of a second set of bits of the digital phase signal based on the second set of bits of the digital phase signal.

7. The waveform generator of claim 1, wherein the input stage circuit, the calculating stage circuit, and the output stage circuit each comprise pipeline registers.

8. The waveform generator of claim 1, wherein the digital phase signal comprises at least sixteen bits.

9. A method comprising:
receiving, at a phase-to-amplitude converter, a digital phase signal from a phase accumulator, the digital phase signal representing a phase angle, the phase-to-amplitude converter not including a look-up table and being configured to generate sine and cosine waveform values as digital amplitude signals;
determining, by an input stage of the phase-to-amplitude converter, a first sine value and a first cosine value of at least a first bit of the digital phase signal;
determining, by the input stage of the phase-to-amplitude converter, a second sine value and a second cosine value of at least a second bit of the digital phase signal;
calculating, by a calculating stage of the phase-to-amplitude converter having inputs coupled to outputs of the input stage of the phase-to-amplitude converter, a third sine value and a third cosine value based on the first and second sine values and the first and second cosine values, the calculating stage comprising multiple sum-of-products circuits, each of the multiple sum-of-products circuits comprising multipliers and adders; and
generating, by an output stage of the phase-to-amplitude converter having inputs coupled to outputs of the calculating stage of the phase-to-amplitude converter, the digital amplitude signals based at least partially on the third sine value and the third cosine value, the output stage comprising a sum-of-products circuit, the sum-of-products circuit comprising multipliers and adders.

10. The method of claim 9, wherein the digital phase signal comprises at least sixteen bits.

11. The method of claim 9 further comprising:
calculating, by the calculating stage of the phase-to-amplitude converter, a fourth sine value and a fourth cosine value, the digital amplitude signals being at least partially based on the fourth sine value and the fourth cosine value.

12. The method of claim 9 further comprising:
pipelining the input stage and the output stage with pipeline registers.

13. The method of claim 9, wherein calculating a third sine value and a third cosine value based on the first and second sine values and the first and second cosine values comprises:
adding the product of the first sine value and the second cosine value to the product of the first cosine value and the second sine value to generate the third sine value; and
subtracting the product of the first sine value and the second sine value from the product of the first cosine value and the second cosine value to generate the third cosine value.

14. The method of claim 9, wherein determining the first sine value and the first cosine value of the first bit of the digital phase signal comprises:
selecting the first sine value and the first cosine value with one or more multiplexers in the input stage, outputs of the one or more multiplexers being selected at least partially by the first bit of the digital phase signal.

15. A phase-to-amplitude converter comprising:
a first stage circuit configured to receive, from a phase accumulator, a digital phase signal representing a phase angle, the digital phase signal having at least sixteen bits, the first stage circuit being further configured to determine sine and cosine values of the digital phase signal, and output the determined sine and cosine values of the digital phase signal, the first stage circuit comprising:
an input stage circuit configured to receive the digital phase signal, determine sine and cosine values of the digital phase signal, and output the determined sine and cosine values of the digital phase signal;
a calculating stage circuit having inputs coupled to outputs of the input stage circuit, the calculating stage circuit configured to calculate sine and cosine values based on the determined sine and cosine values output of the input stage circuit, the calculating stage circuit comprising multiple sum-of-products circuits, each of the multiple sum-of-products circuits comprising of multipliers and adders; and
a second stage circuit directly connected to the output of the first stage circuit, the second stage circuit configured to calculate sine and cosine values of the determined sine and cosine values of the digital phase signal, the second stage circuit comprising:
an output stage circuit having inputs coupled to outputs of the calculating stage circuit, the output stage circuit configured to calculate sine and cosine values based on the determined sine and cosine values of the calculating stage circuit, the output stage circuit comprising a sum-of-products circuit, the sum-of-products circuit comprising of multipliers and adders, the calculated sine and cosine values forming digital amplitude signals, wherein the phase-to-amplitude converter does not include a look-up table.

16. The phase-to-amplitude converter of claim 15, wherein the second stage circuit further comprises a pipeline register.

\* \* \* \* \*